(12) United States Patent
Cheng et al.

(10) Patent No.: US 8,665,729 B2
(45) Date of Patent: Mar. 4, 2014

(54) METHOD FOR PERFORMING RADIO LINK CONTROL WITH ROUND TRIP TIME AWARENESS, AND ASSOCIATED APPARATUS

(75) Inventors: Yi-Ting Cheng, Taipei (TW); Peng-An Chen, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 193 days.

(21) Appl. No.: 13/400,124

(22) Filed: Feb. 20, 2012

(65) Prior Publication Data

US 2013/0028096 A1 Jan. 31, 2013

Related U.S. Application Data

(60) Provisional application No. 61/513,129, filed on Jul. 29, 2011.

(51) Int. Cl.
*H04W 4/00* (2009.01)
*H04H 20/71* (2008.01)
*H04L 12/26* (2006.01)

(52) U.S. Cl.
USPC ........ 370/241; 370/312; 370/329; 455/67.11; 455/522

(58) Field of Classification Search
USPC ........ 370/230–252, 312–329, 342, 345, 389, 370/392, 395.42; 455/67.11, 127.1, 522
See application file for complete search history.

(56) References Cited

U.S. PATENT DOCUMENTS

| | | | |
|---|---|---|---|
| 7,489,691 B2* | 2/2009 | Wigard et al. | 370/395.42 |
| 8,125,910 B2* | 2/2012 | Shimonishi et al. | 370/236 |
| 8,160,634 B1* | 4/2012 | Vargantwar et al. | 455/522 |
| 2005/0041581 A1* | 2/2005 | Kuusinen et al. | 370/230 |
| 2007/0008884 A1* | 1/2007 | Tang | 370/230 |
| 2009/0207771 A1* | 8/2009 | Lindskog et al. | 370/312 |
| 2010/0034185 A1* | 2/2010 | De Bruin et al. | 370/342 |
| 2013/0010705 A1* | 1/2013 | Jonsson et al. | 370/329 |

* cited by examiner

*Primary Examiner* — Afsar M Qureshi
(74) *Attorney, Agent, or Firm* — Winston Hsu; Scott Margo

(57) ABSTRACT

A method for performing radio link control (RLC) with round trip time (RTT) awareness is provided, where the method is applied to an electronic device. The method includes: dynamically estimating an index according to one or more factors; and based upon the index, dynamically adjusting a status prohibit timer value of a status prohibit timer for performing RLC. For example, the index can be an RTT of transmission/retransmission, and the step of dynamically estimating the index may further include: dynamically estimating the RTT of transmission/retransmission by detecting a time period between a first time point and a second time point, wherein the first time point represents time of sending a negative acknowledgement (NACK) status report. In another example, the index can be an RTT awareness index, where the method may include estimating the RTT awareness index according to at least one predetermined estimation function. An associated apparatus is also provided.

20 Claims, 10 Drawing Sheets

METHOD FOR PERFORMING RADIO LINK CONTROL WITH ROUND TRIP TIME AWARENESS, AND ASSOCIATED APPARATUS

CROSS REFERENCE TO RELATED APPLICATIONS

This application claims the benefit of U.S. provisional application No. 61/513,129, which was filed on Jul. 29, 2011, and is entitled "METHOD FOR DYNAMICALLY ADJUSTING RETRANSMISSION PARAMETER IN A COMMUNICATION DEVICE".

BACKGROUND

The present invention relates to radio link control of an electronic device, and more particularly, to a method for performing radio link control (RLC) with round trip time (RTT) awareness, and to an associated apparatus.

A conventional portable electronic device implemented according to the related art (e.g., a multifunctional mobile phone, a personal digital assistant (PDA), a tablet, etc) can be very helpful to an end user, and the end user may rely on many applications thereof. In a situation where the end user utilizes the conventional portable electronic device to communicate or access data through a network whose channel quality varies significantly with respect to time, some problems may occur. For example, when the number of negative acknowledgement/acknowledge (NACK, or NAK) status protocol data units (PDUs) received by the transmitting side RLC entity increases due to low channel quality, the number of retransmission operations that should be scheduled typically increases correspondingly. As the retransmission RTT between peer RLC entities may become longer, frequent NACK status PDUs may cause user equipment (UE) such as the conventional portable electronic device to receive several PDUs of the same sequence number (SN), where the later retransmitted data PDUs with the same SN are typically regarded as redundant and discarded by the receiving side RLC entity. Please note that, when NACK status PDUs such as those mentioned above are sent too frequently, the transmitting side RLC entity may be forced to retransmit potentially unnecessary PDUs, which may waste network transmission bandwidth and degrade the throughput performance. Thus, a novel method is required for enhancing RLC of an electronic device.

SUMMARY

It is therefore an objective of the claimed invention to provide a method for performing radio link control (RLC) with round trip time (RTT) awareness, and to provide an associated apparatus, in order to solve the above-mentioned problems.

An exemplary embodiment of a method for performing RLC with RTT awareness is provided, where the method is applied to an electronic device. The method comprises: dynamically estimating an RTT of transmission/retransmission; and based upon the RTT, dynamically adjusting a status prohibit timer value of a status prohibit timer for performing RLC. In particular, the step of dynamically estimating the RTT of transmission/retransmission further comprises: dynamically estimating the RTT of transmission/retransmission by detecting a time period between a first time point and a second time point, wherein the first time point represents time of sending a negative acknowledgement (NACK) status report, and the second time point represents time of value transient of a protocol variable corresponding to an RLC receive window of the electronic device.

An exemplary embodiment of an apparatus for performing RLC with RTT awareness is provided, where the apparatus comprises at least one portion of an electronic device. The apparatus comprises a processing circuit arranged to control operations of the electronic device, wherein the processing circuit comprises an estimation module and an adjustment module. The estimation module is arranged to dynamically estimate an RTT of transmission/retransmission. In addition, based upon the RTT, the adjustment module dynamically adjusts a status prohibit timer value of a status prohibit timer for performing RLC. In particular, the estimation module dynamically estimates the RTT of transmission/retransmission by detecting a time period between a first time point and a second time point, wherein the first time point represents time of sending a NACK status report, and the second time point represents time of value transient of a protocol variable corresponding to an RLC receive window of the electronic device.

An exemplary embodiment of an apparatus for performing RLC with RTT awareness is provided, where the apparatus comprises at least one portion of an electronic device. The apparatus comprises a processing circuit arranged to control operations of the electronic device, wherein the processing circuit comprises an estimation module and an adjustment module. The estimation module is arranged to dynamically estimate an RTT awareness index according to at least one predetermined estimation function. In addition, based upon the RTT awareness index, the adjustment module dynamically adjusts a status prohibit timer value of a status prohibit timer for performing RLC. In particular, the estimation module monitors at least one factor regarding the electronic device, and estimates the RTT awareness index by applying the at least one predetermined estimation function to the at least one factor.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
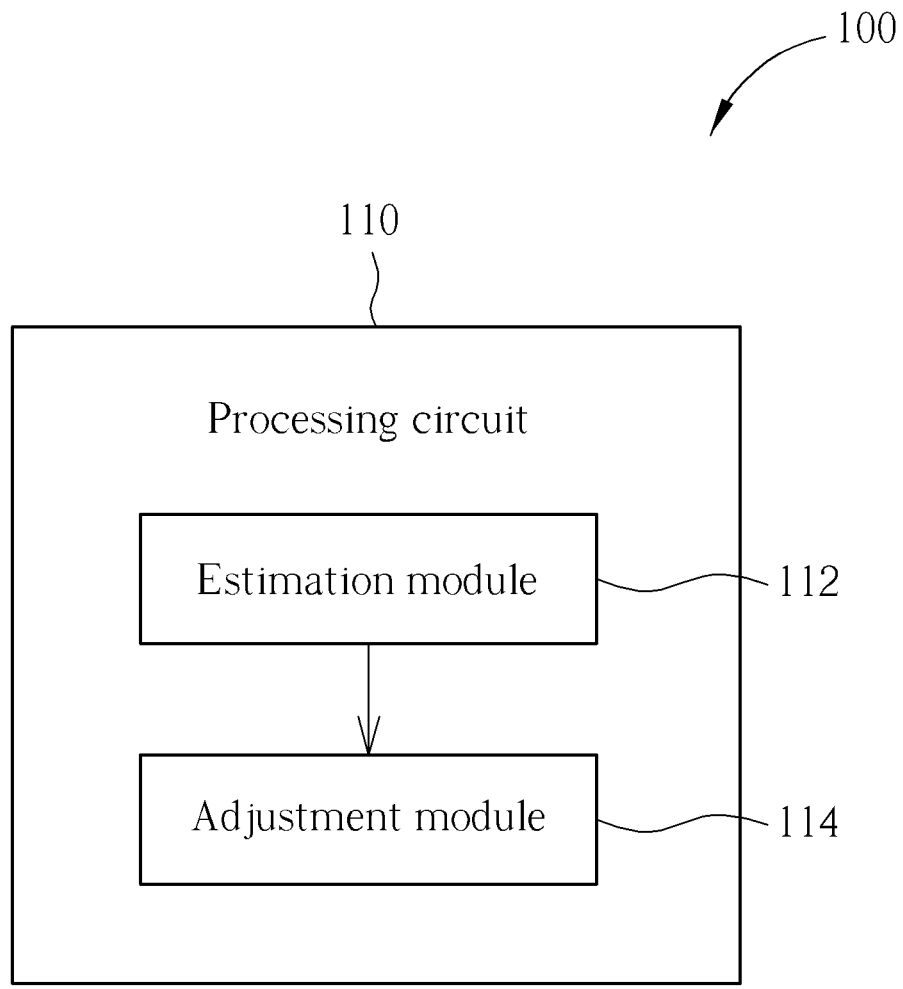
FIG. 1 is a diagram of an apparatus for performing radio link control (RLC) with round trip time (RTT) awareness according to a first embodiment of the present invention.

Please refer to FIG. 1, which illustrates a diagram of an apparatus 100 for performing radio link control (RLC) with round trip time (RTT) awareness according to a first embodiment of the present invention. According to different embodiments, such as the first embodiment and some variations thereof, the apparatus 100 may comprise at least one portion (e.g. a portion or all) of an electronic device, where the electronic device can be a communication device (more particularly, the so-called user equipment (UE)) that operates within a network. For example, the apparatus 100 may comprise a portion of the electronic device mentioned above, and more particularly, can be a control circuit such as an integrated circuit (IC) within the electronic device. In another example, the apparatus 100 can be the whole of the electronic device mentioned above. In another example, the apparatus 100 can be an audio/video system comprising the electronic device mentioned above. Examples of the electronic device may include, but not limited to, a mobile phone (e.g. a multifunctional mobile phone), a personal digital assistant (PDA), a portable electronic device such as the so-called tablet (based on a generalized definition), and a personal computer such as a tablet personal computer (which can also be referred to as the tablet, for simplicity), a laptop computer, or desktop computer.

As shown in FIG. 1, the apparatus 100 comprises a processing circuit 110 arranged to control operations of the electronic device, where the processing circuit 110 comprises an estimation module 112 and an adjustment module 114. The estimation module 112 is arranged to dynamically estimate an RTT of transmission/retransmission. In addition, the adjustment module 114 is arranged to dynamically adjust a status prohibit timer value of a status prohibit timer for performing RLC, based upon the RTT. In practice, the estimation module 112 can dynamically estimate the RTT of transmission/retransmission by detecting a time period between a first time point and a second time point, where the first time point may represent the time of sending a negative acknowledgement (NACK) status report, and the second time point may represent the time of value transient of a protocol variable corresponding to an RLC receive window of the electronic device. This is for illustrative purposes only, and is not meant to be a limitation of the present invention. According to some variations of this embodiment, the estimation module 112 is arranged to dynamically estimate an RTT awareness index according to at least one predetermined estimation function, and based upon the RTT awareness index, the adjustment module 114 dynamically adjusts the aforementioned status prohibit timer value of the status prohibit timer for performing RLC.

More particularly, in these variations, the estimation module 112 can monitor at least one factor (e.g. one or more parameters) regarding the electronic device, and estimate the RTT awareness index by applying the aforementioned at least one predetermined estimation function to the aforementioned at least one factor. For example, the aforementioned at least one factor may comprise the ratio of energy per modulating bit to noise spectral density, the received signal code power, the propagation delay, and/or the condition of whether the electronic device is moving. That is, the aforementioned at least one factor may comprise one or a combination of the ratio of the energy per modulating bit to the noise spectral density, the received signal code power, the propagation delay, and the condition of whether the electronic device is moving. In another example, the aforementioned at least one factor may comprise the number of out of window protocol data units (PDUs) dropped by an RLC layer of the processing circuit 110 due to redundant transmission (e.g. the PDUs that are determined to be outside the RLC receive window mentioned above), the ratio of the out of window PDUs to a plurality of PDUs under consideration, and/or the application layer throughput. That is, the aforementioned at least one factor may comprise one or a combination of the number of the out of window PDUs, the ratio of the out of window PDUs to the PDUs under consideration, and the application layer throughput. In another example, the aforementioned at least one factor may comprise the instantaneous velocity of the electronic device, the average velocity of the electronic device, and/or the condition of whether the electronic device is moving. That is, the aforementioned at least one factor may comprise one or a combination of the instantaneous velocity of the electronic device, the average velocity of the electronic device, and the condition of whether the electronic device is moving. In practice, a function $G_0$ can be defined to take the aforementioned at least one factor (e.g. the aforementioned one or more parameters) as input and to generate the RTT awareness index, where based upon the RTT awareness index, the adjustment module 114 can dynamically adjust the aforementioned status prohibit timer value of the status prohibit timer for performing RLC.

Please note that, no matter whether the estimation module 112 is arranged to dynamically estimate the RTT or the RTT awareness index, the adjustment module 114 can dynamically adjust the status prohibit timer value with RTT awareness. As a result, the processing circuit 110 can prevent redundant NACK status reports. Thus, in any of the first embodiment and the variations disclosed above, based upon the dynamically estimated RTT or the dynamically estimated RTT awareness index, the adjustment module 114 can dynamically adjust the status prohibit timer value of the status prohibit timer for performing RLC, in order to decrease probability of repeated data PDU retransmission.

Figure 2:
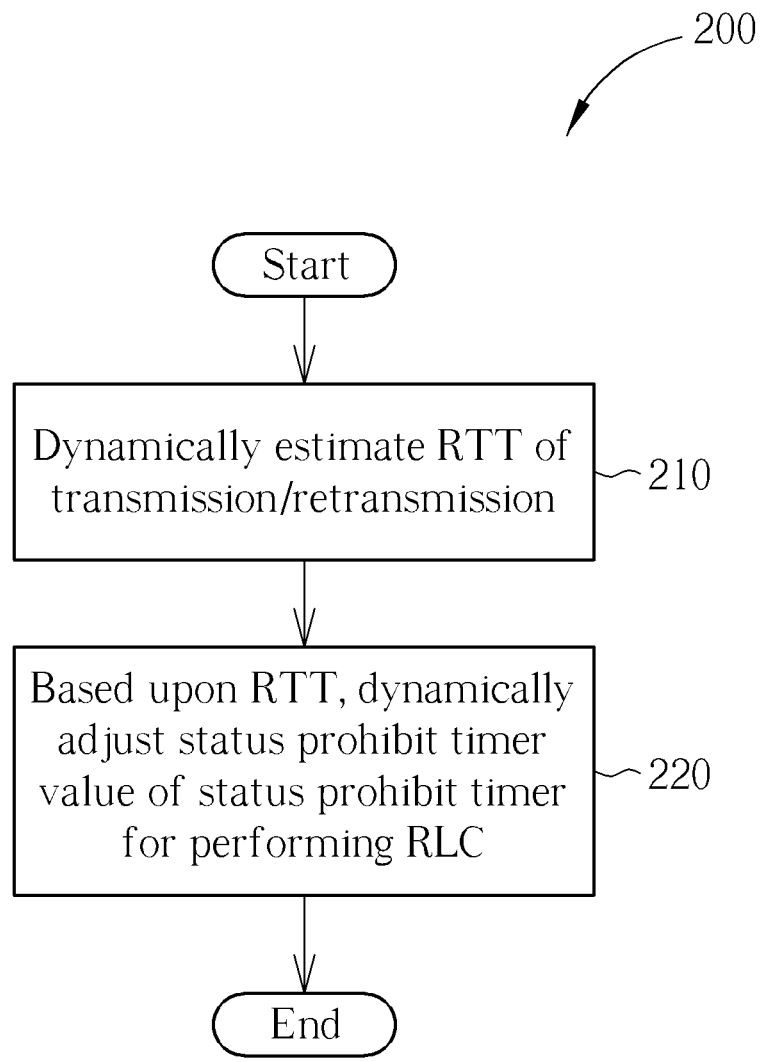
FIG. 2 illustrates a flowchart of a method for performing RLC with RTT awareness according to an embodiment of the present invention.

FIG. 2 illustrates a flowchart of a method 200 for performing RLC with RTT awareness according to an embodiment of the present invention. The method shown in FIG. 2 can be applied to the apparatus 100 shown in FIG. 1. The method is described as follows.

In Step 210, the estimation module 112 dynamically estimates an RTT of transmission/retransmission, such as the RTT mentioned in the first embodiment. For example, the estimation module 112 dynamically estimates the RTT of transmission/retransmission by detecting a time period such as the aforementioned time period between the first time point and the second time point, where the first time point represents the time of sending the NACK status report mentioned above, and the second time point represents the time of value transient of the aforementioned protocol variable corresponding to the RLC receive window mentioned above. In particular, the protocol variable can be the so-called protocol variable VR(R) defined/mentioned in the 3rd Generation Partnership Project (3GPP) specifications such as that labeled "3GPP TS 25.332".

In Step 220, based upon the RTT, the adjustment module 114 dynamically adjusts a status prohibit timer value of a status prohibit timer for performing RLC, such as the aforementioned status prohibit timer value of the status prohibit timer in the first embodiment. In particular, the adjustment module 114 dynamically adjusts the status prohibit timer value by applying at least one predetermined function to a plurality of samples of the dynamically estimated RTT. For example, the aforementioned at least one predetermined function utilized by the adjustment module 114 may comprise a weighted average function. In another example, the aforementioned at least one predetermined function utilized by the adjustment module 114 may comprise a screening function for discarding non-qualified samples of the dynamically estimated RTT that fall outside a range of a predetermined interval. In another example, the aforementioned at least one predetermined function utilized by the adjustment module 114 may comprise the weighted average function and/or the screening function.

According to this embodiment, the protocol variable mentioned in the descriptions of Step 210, such as the protocol variable VR(R), may represent a boundary of the RLC receive window, where the protocol variable (e.g. the protocol variable VR(R)) typically indicates a possible sequence number (SN) of PDUs. In addition, the NACK status report can be a NACK status PDU, where a field of the NACK status PDU may indicate a NACK status, and can be utilized for notifying the network of the need of retransmission.

Please note that, as the adjustment module 114 can dynamically adjust the status prohibit timer value with RTT awareness, and more particularly, can dynamically adjust the status prohibit timer value to be greater than the dynamically estimated RTT, the processing circuit 110 can prevent redundant NACK status reports. Thus, based upon the RTT that is dynamically estimated, the adjustment module 114 can dynamically adjust the status prohibit timer value of the status prohibit timer for performing RLC, in order to decrease probability of repeated data PDU retransmission.

Figure 3:
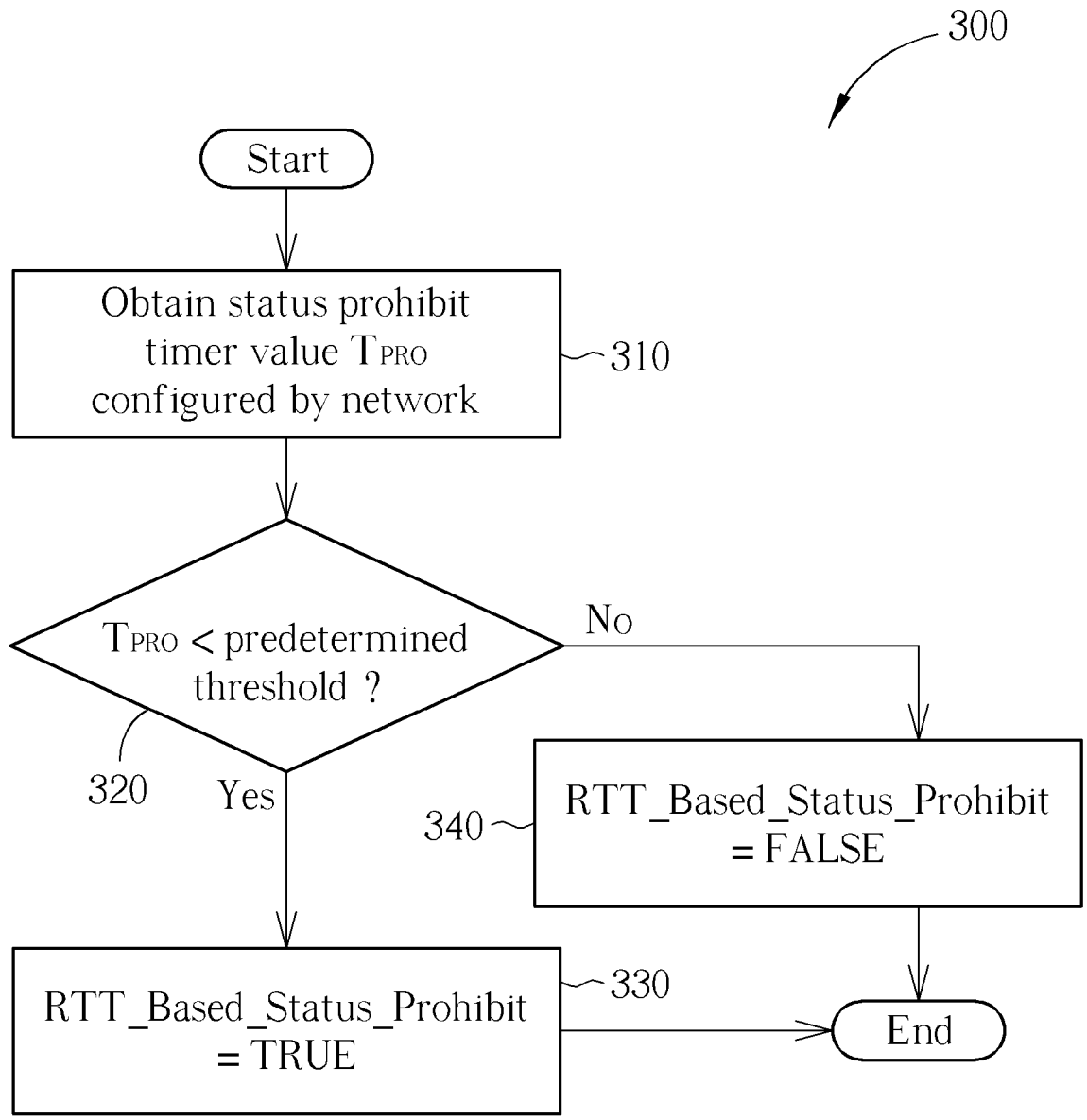
FIG. 3 illustrates a working flow involved with the method shown in FIG. 2 according to an embodiment of the present invention.

FIG. 3 illustrates a working flow 300 involved with the method 200 shown in FIG. 2 according to an embodiment of the present invention. In this embodiment, a notation $T_{PRO}$ is utilized for representing the status prohibit timer value.

In Step 310, the processing circuit 110 obtains the status prohibit timer value $T_{PRO}$ configured by the network.

In Step 320, the processing circuit 110 checks whether the status prohibit timer value $T_{PRO}$ is less than a predetermined threshold. When it is detected that the status prohibit timer value $T_{PRO}$ is less than the predetermined threshold, Step 330 is entered; otherwise, Step 340 is entered.

In Step 330, the processing circuit 110 sets the logical value of a parameter RTT_Based_Status_Prohibit to be true (labeled "RTT_Based_Status_Prohibit=TRUE" in FIG. 3), which means the processing circuit 110 enables RTT-based status prohibit control (e.g. the operations disclosed in the method 200), in order to re-configure or adjust the status prohibit timer value $T_{PRO}$.

In Step 340, the processing circuit 110 sets the logical value of the parameter RTT_Based_Status_Prohibit to be false (labeled "RTT_Based_Status_Prohibit=FALSE" in FIG. 3), which means the processing circuit 110 disables the RTT-based status prohibit control (e.g. the operations disclosed in the method 200).

Figure 4:
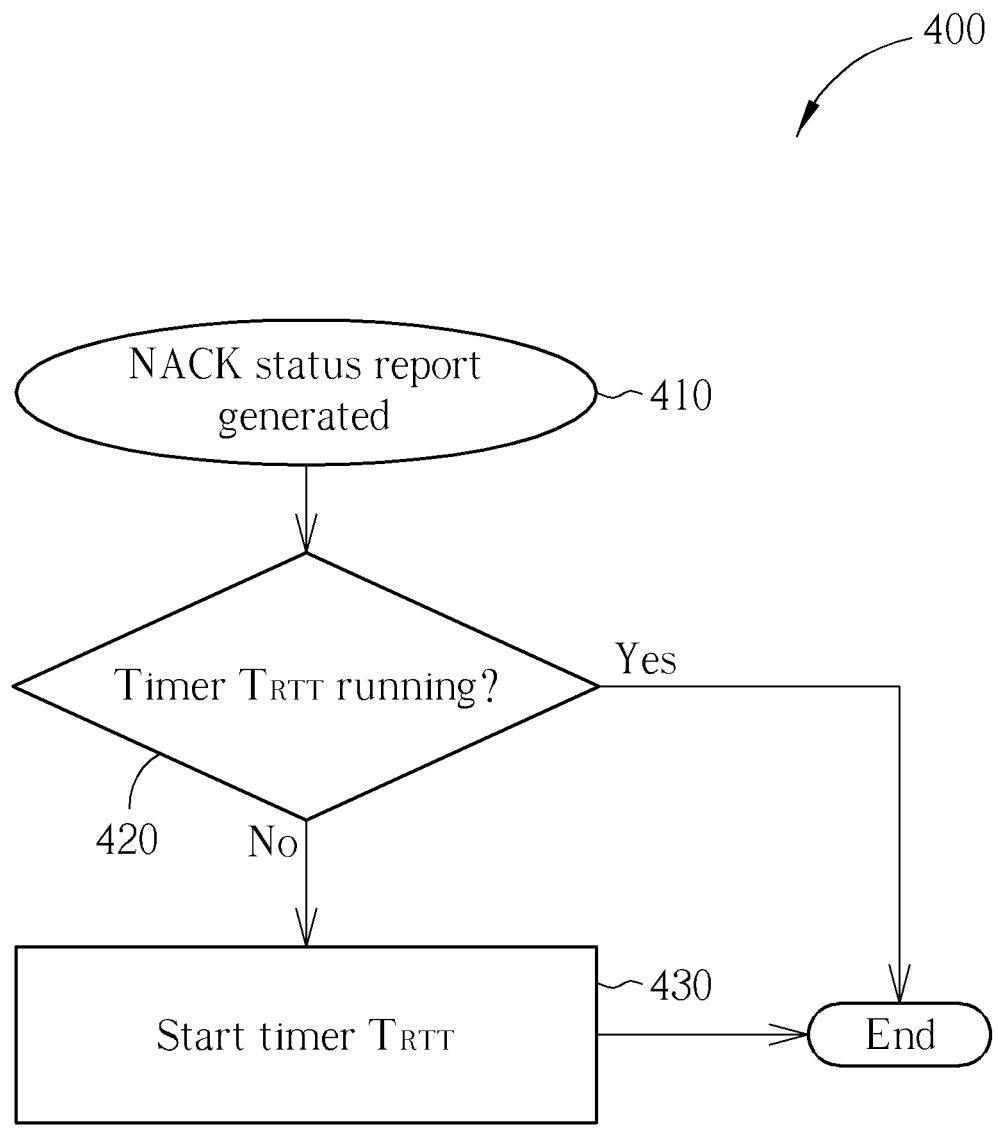
FIG. 4 illustrates a working flow involved with the method shown in FIG. 2 according to another embodiment of the present invention.

FIG. 4 illustrates a working flow 400 involved with the method 200 shown in FIG. 2 according to another embodiment of the present invention. In this embodiment, a notation $T_{RTT}$ is utilized for representing a timer for determining the time period mentioned in the descriptions of Step 210.

In Step 410, the processing circuit 110 starts the working flow 400 when it is detected that a NACK status report (e.g. the NACK status report mentioned in the descriptions of Step 210) is generated. More particularly, when the processing circuit 110 sends the NACK status report, it immediately starts the working flow 400.

In Step 420, the processing circuit 110 checks whether the timer $T_{RTT}$ is running When it is detected that the timer $T_{RTT}$ is running, the working flow 400 comes to the end; otherwise, Step 430 is entered.

In Step 430, the processing circuit 110 (more particularly, the estimation module 112) starts the timer $T_{RTT}$, where the time of starting the timer $T_{RTT}$ is taken as an example of the first time point mentioned above.

Figure 5:
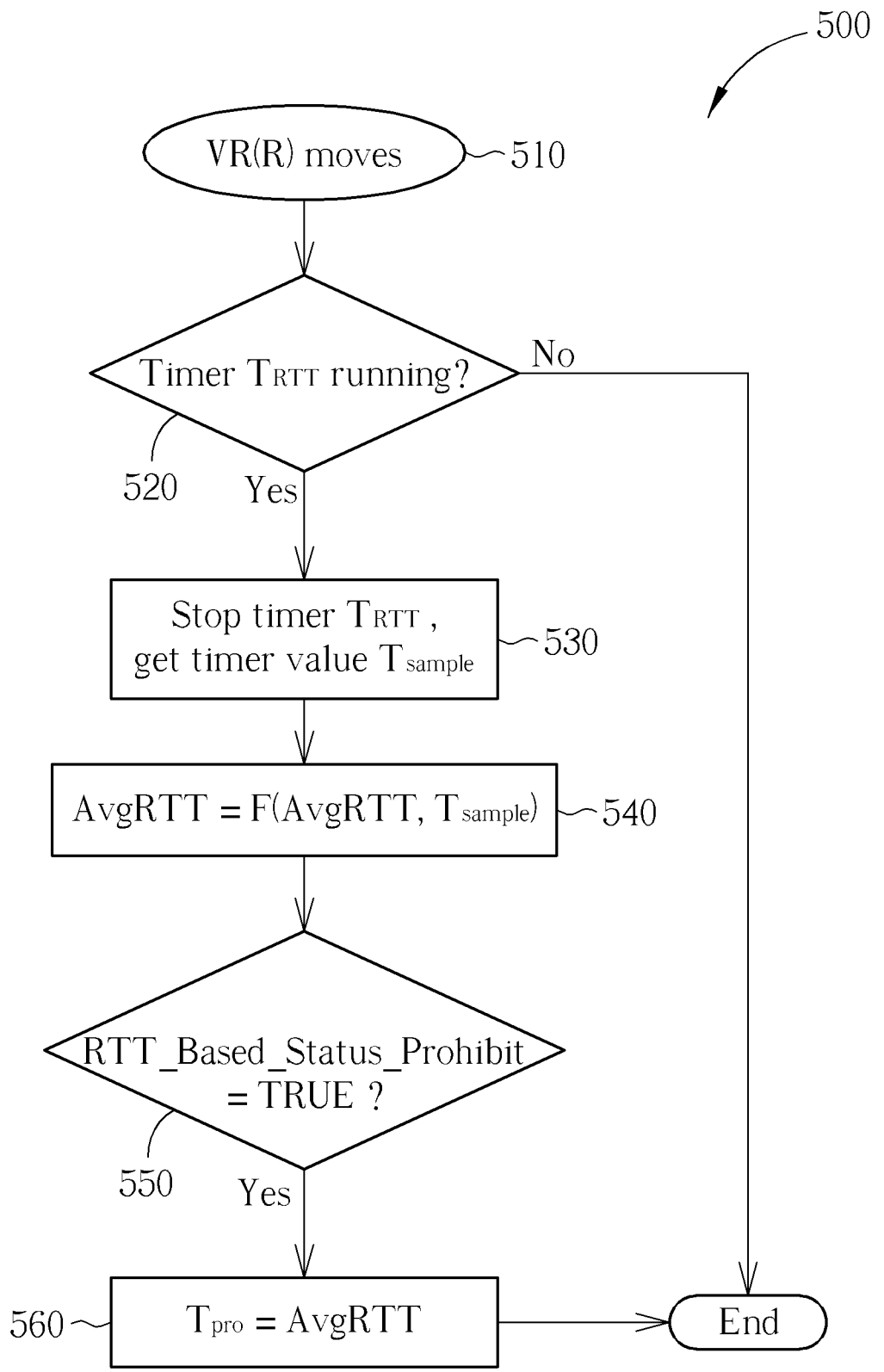
FIG. 5 illustrates a working flow involved with the method shown in FIG. 2 according the embodiment shown in FIG. 4.

FIG. 5 illustrates a working flow 500 involved with the method 200 shown in FIG. 2 according to the embodiment shown in FIG. 4.

In Step 510, the processing circuit 110 starts the working flow 500 when it is detected that the protocol variable VR(R) moves, which means the processing circuit 110 starts the working flow 500 when the value transient of the protocol variable VR(R)) is detected.

In Step 520, the processing circuit 110 checks whether the timer $T_{RTT}$ is running When it is detected that the timer $T_{RTT}$ is running, Step 530 is entered; otherwise, the working flow 500 comes to the end.

In Step 530, the processing circuit 110 (more particularly, the estimation module 112) stops the timer $T_{RTT}$, and gets the timer value $T_{sample}$ thereof, where the time of stopping the timer $T_{RTT}$ is taken as an example of the second time point mentioned above, and the timer value $T_{sample}$ is taken as an example of the time period mentioned in the descriptions of Step 210. Please note that the timer value $T_{sample}$ can be taken as an example of a sample of the plurality of samples mentioned in the descriptions of Step 220.

In Step 540, the processing circuit 110 (more particularly, the adjustment module 114) applies the aforementioned at least one predetermined function mentioned in the descriptions of Step 220, such as the predetermined function $F(AvgRTT, T_{sample})$, to the timer value $T_{sample}$ (labeled "AvgRTT=F(AvgRTT, $T_{sample}$)" in FIG. 5). According to this embodiment, the estimation module 112 can obtain a sample set $\{T_{sample}\}$ by executing the working flows 400 and 500 multiple times, and the sample set $\{T_{sample}\}$ can be taken as an example of the plurality of samples mentioned in the descriptions of Step 220, i.e. the samples of the dynamically estimated RTT. Please note that the notation AvgRTT may represent an average value of at least one portion (e.g. a portion or all) of the sample set $\{T_{sample}\}$.

In Step 550, the processing circuit 110 (more particularly, the adjustment module 114) checks whether the logical value of the parameter RTT_Based_Status_Prohibit is set to be true (labeled "RTT_Based_Status_Prohibit=TRUE?" in FIG. 5).

When it is detected that the logical value of the parameter RTT_Based_Status_Prohibit is set to be true, Step 560 is entered; otherwise, the processing circuit 110 may perform another operation (not shown in FIG. 5).

In Step 560, the processing circuit 110 (more particularly, the adjustment module 114) sets the status prohibit timer value $T_{PRO}$ to be the average value AvgRTT (labeled "$T_{PRO}$=AvgRTT" in FIG. 5).

According to this embodiment, by utilizing the predetermined function F(AvgRTT, $T_{sample}$), the adjustment module 114 may selectively perform a weighted average operation on (AvgRTT, $T_{sample}$) or discard the timer value $T_{sample}$ under consideration. For example, the adjustment module 114 may discard the timer value $T_{sample}$ in a situation where the result of applying the screening function to the timer value $T_{sample}$ indicates that the timer value $T_{sample}$ is a non-qualified sample of the dynamically estimated RTT, and more particularly, a non-qualified sample that falls outside the range of the predetermined interval. In another example, the adjustment module 114 may perform the weighted average operation according to one of the following equations:

$$AvgRTT=(AvgRTT+T_{sample})/2; \text{ or}$$

$$AvgRTT=(AvgRTT*w_1+T_{sample}*w_2)/2;$$

where the notations $w_1$ and $w_2$ represent weighted parameters.

Figure 6:
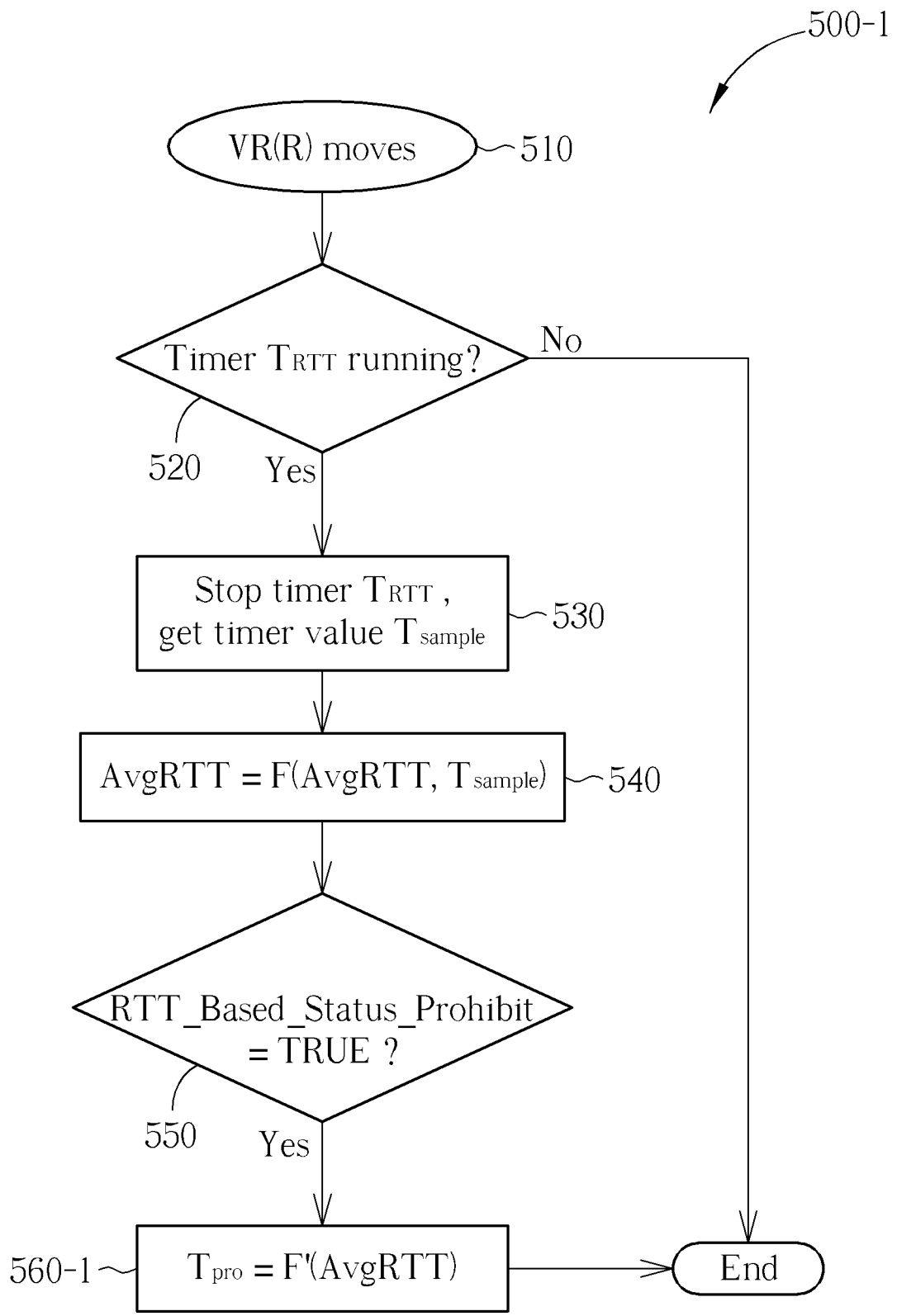
FIG. 6 illustrates a working flow involved with the method shown in FIG. 2 according a variation of the embodiment shown in FIG. 5.
Figure 7:
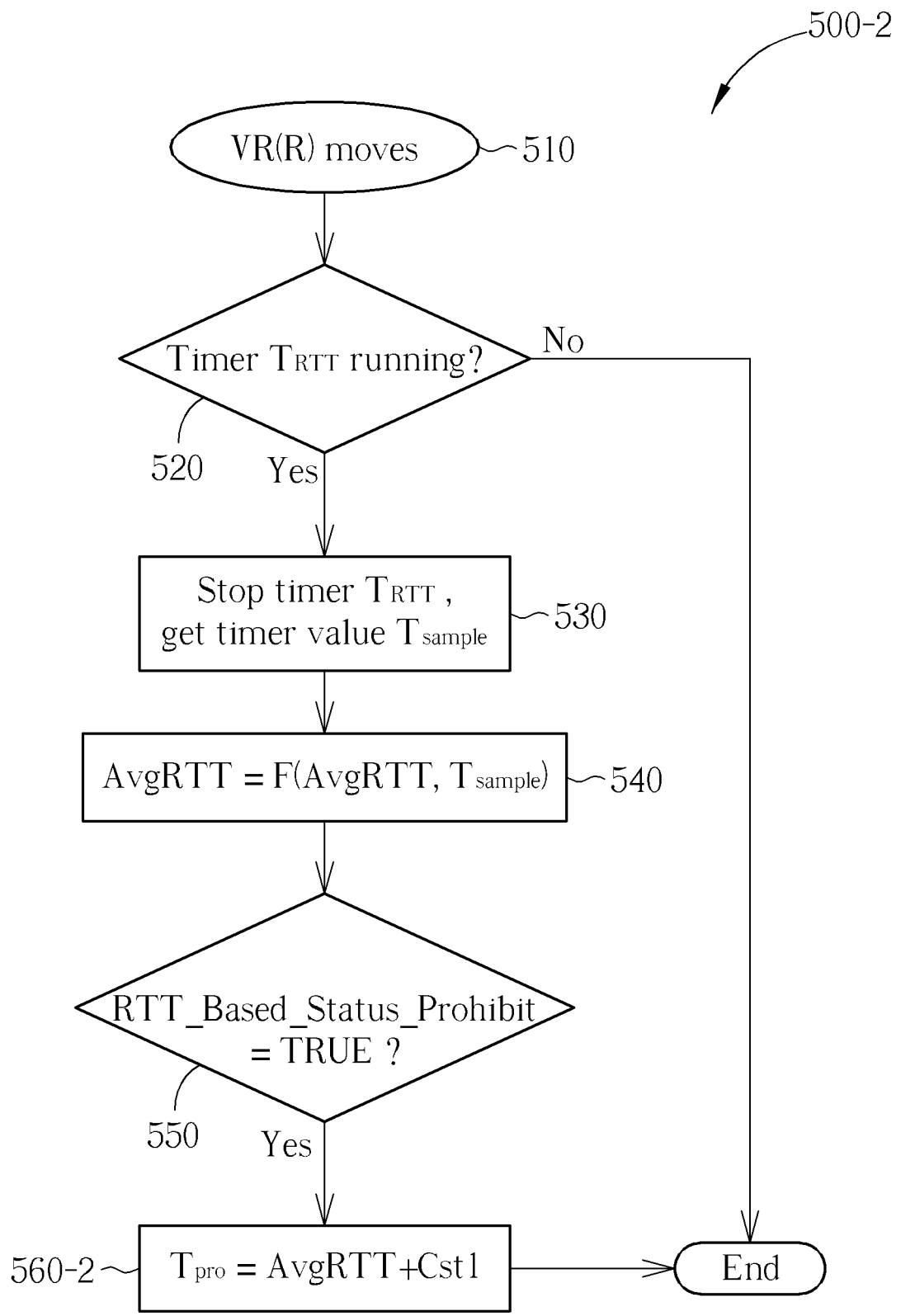
FIG. 7 illustrates a working flow involved with the method shown in FIG. 2 according another variation of the embodiment shown in FIG. 5.
Figure 8:
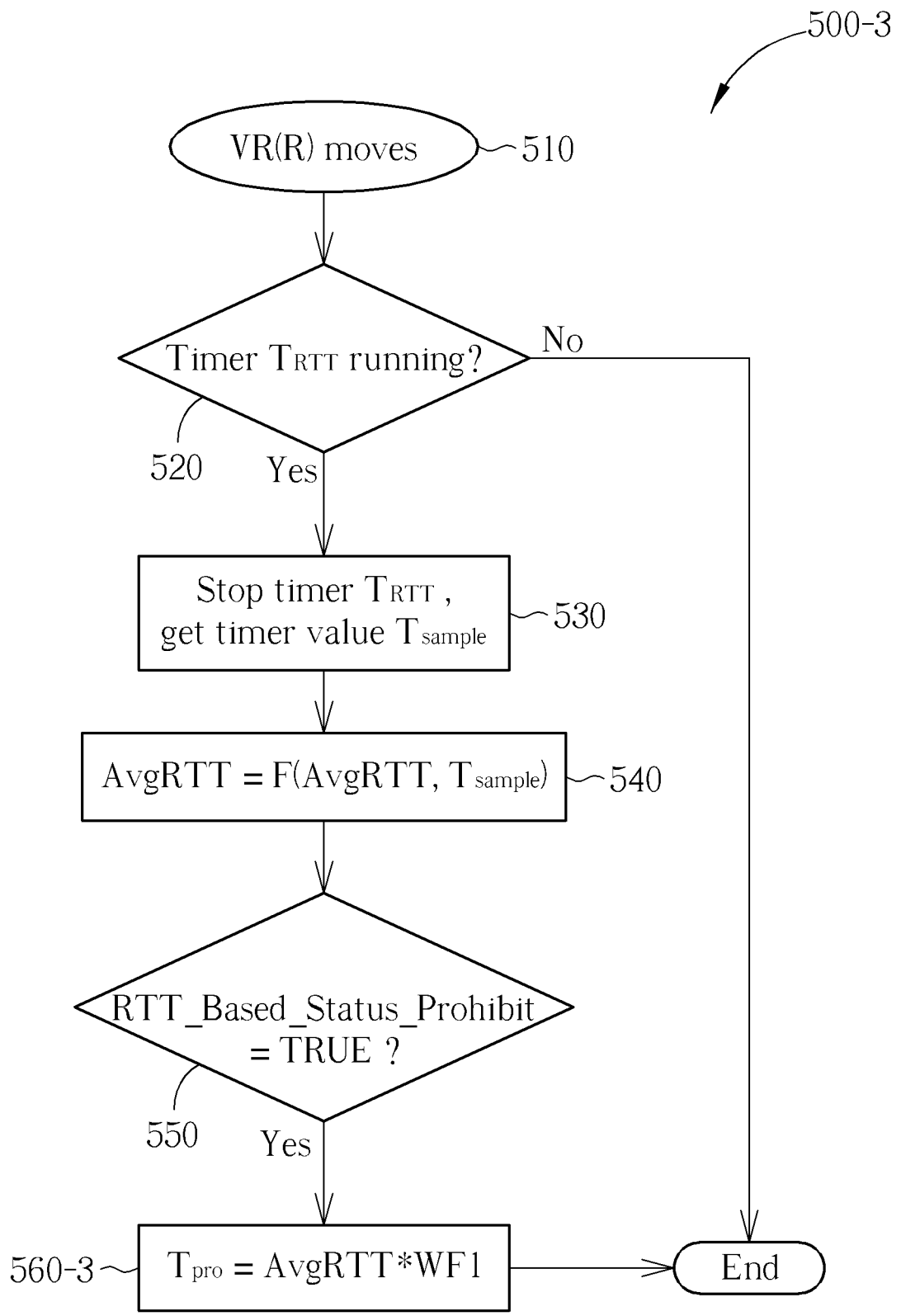
FIG. 8 illustrates a working flow involved with the method shown in FIG. 2 according another variation of the embodiment shown in FIG. 5.

According to some variations of this embodiment, such as the embodiments respectively shown in FIG. 6, FIG. 7, and FIG. 8, the adjustment module 114 can dynamically adjust the status prohibit timer value $T_{PRO}$ to be greater than the dynamically estimated RTT such as the average value AvgRTT of the embodiment shown in FIG. 5. For example, the processing circuit 110 (more particularly, the adjustment module 114) can tune the status prohibit timer value $T_{PRO}$ to be slightly greater than the average value AvgRTT obtained in Step 540 shown in FIG. 5.

According to the embodiment shown in FIG. 6, Step 560 shown in FIG. 5 can be replaced by Step 560-1, where the numeral 500 is replaced by 500-1 in response to the change of Step 560. In Step 560-1, the processing circuit 110 (more particularly, the adjustment module 114) sets the status prohibit timer value $T_{PRO}$ to be a function F' of the average value AvgRTT (labeled "$T_{PRO}$=F'(AvgRTT)" in FIG. 6), in order to adjust the status prohibit timer value $T_{PRO}$ to be greater than the dynamically estimated RTT such as the average value AvgRTT obtained in Step 540. For example, by utilizing the function F', the processing circuit 110 (more particularly, the adjustment module 114) can tune the status prohibit timer value $T_{PRO}$ to be slightly greater than the average value AvgRTT obtained in Step 540. Similar descriptions are not repeated in detail for this embodiment.

According to the embodiment shown in FIG. 7, Step 560 shown in FIG. 5 can be replaced by Step 560-2, where the numeral 500 is replaced by 500-2 in response to the change of Step 560. In Step 560-2, the processing circuit 110 (more particularly, the adjustment module 114) sets the status prohibit timer value $T_{PRO}$ to be the summation of the average value AvgRTT and a positive constant Cst1 (labeled "$T_{PRO}$=AvgRTT+Cst1" in FIG. 7), in order to adjust the status prohibit timer value $T_{PRO}$ to be greater than the dynamically estimated RTT such as the average value AvgRTT obtained in Step 540. For example, by utilizing the positive constant Cst1, the processing circuit 110 (more particularly, the adjustment module 114) can tune the status prohibit timer value $T_{PRO}$ to be slightly greater than the average value AvgRTT obtained in Step 540. Similar descriptions are not repeated in detail for this embodiment.

According to the embodiment shown in FIG. 8, Step 560 shown in FIG. 5 can be replaced by Step 560-3, where the numeral 500 is replaced by 500-3 in response to the change of Step 560. In Step 560-3, the processing circuit 110 (more particularly, the adjustment module 114) sets the status prohibit timer value $T_{PRO}$ to be the product of the average value AvgRTT and a weighting factor WF1 (labeled "$T_{PRO}$=AvgRTT*WF1" in FIG. 8), in order to adjust the status prohibit timer value $T_{PRO}$ to be greater than the dynamically estimated RTT such as the average value AvgRTT obtained in Step 540, where the weighting factor WF1 is greater than one. For example, by utilizing the weighting factor WF1, the processing circuit 110 (more particularly, the adjustment module 114) can tune the status prohibit timer value $T_{PRO}$ to be slightly greater than the average value AvgRTT obtained in Step 540. Similar descriptions are not repeated in detail for this embodiment.

Figure 9:
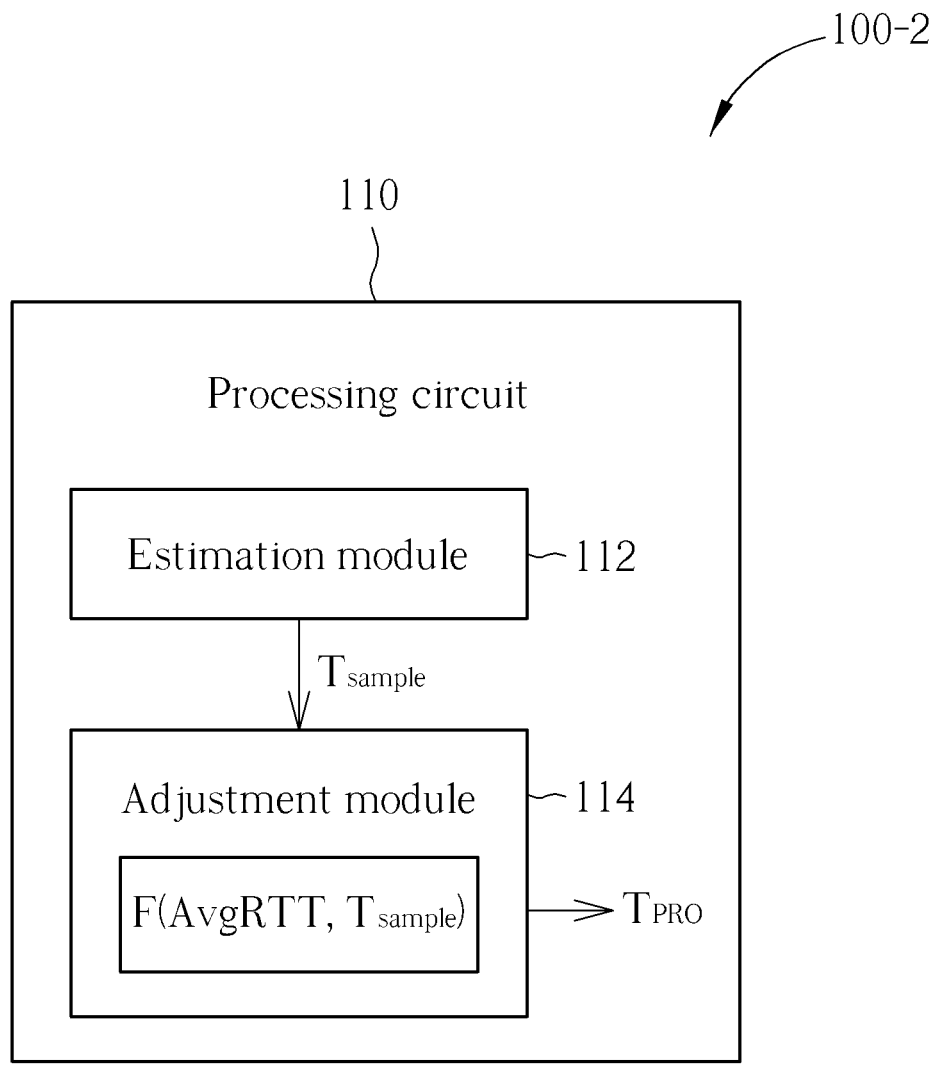
FIG. 9 is a diagram of an apparatus for performing RLC with RTT awareness according to a second embodiment of the present invention.

FIG. 9 is a diagram of an apparatus 100-2 for performing RLC with RTT awareness according to a second embodiment of the present invention. The predetermined function F(AvgRTT, $T_{sample}$), the timer value $T_{sample}$, and the status prohibit timer value $T_{PRO}$ shown in FIG. 9 are the same as those disclosed in the embodiment shown in FIG. 5, respectively. Similar descriptions are not repeated in detail for this embodiment.

Figure 10:
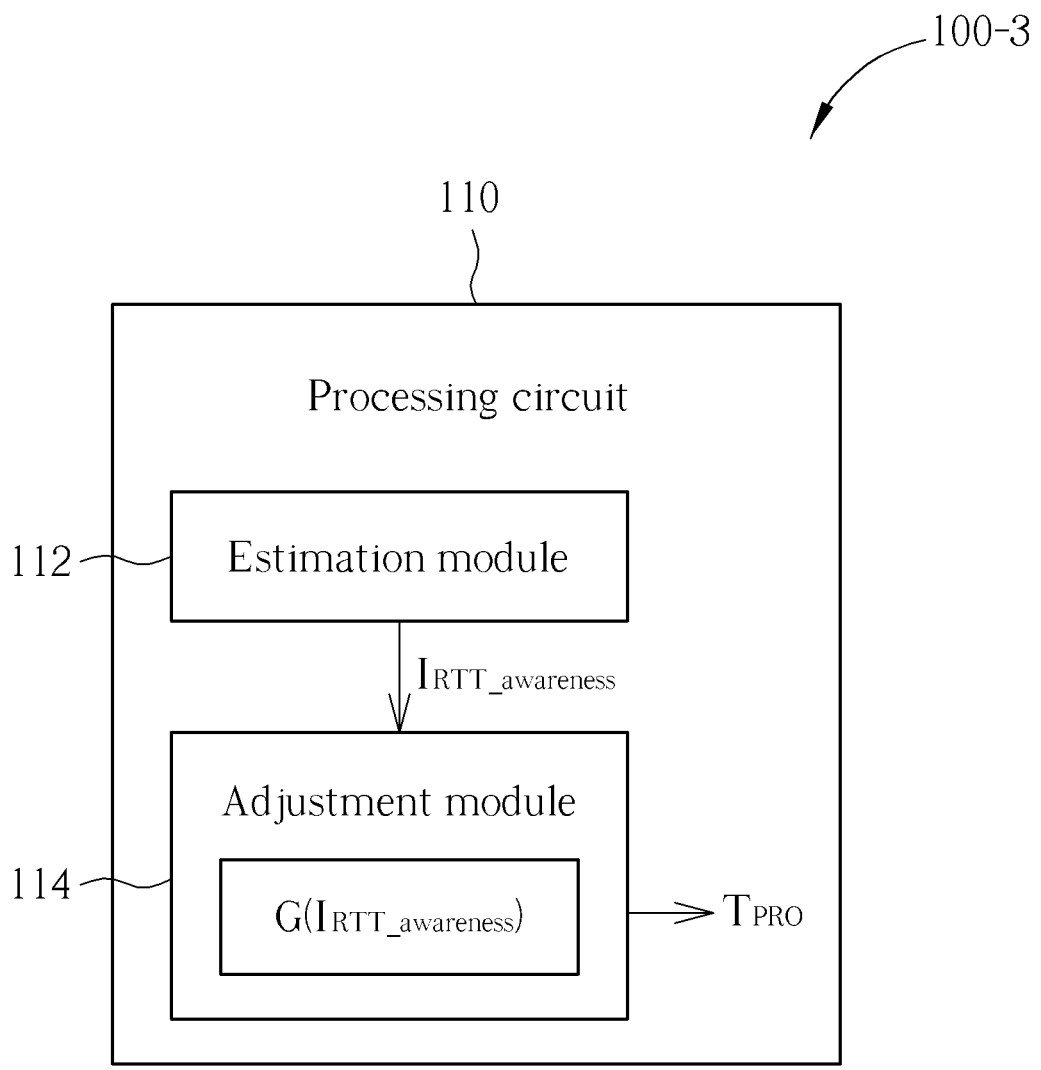
FIG. 10 is a diagram of an apparatus for performing RLC with RTT awareness according to a third embodiment of the present invention.

FIG. 10 is a diagram of an apparatus 100-3 for performing RLC with RTT awareness according to a third embodiment of the present invention, where the notation $I_{RTT\_awareness}$ represents the RTT awareness index disclosed above. Please note that the predetermined function F(AvgRTT, $T_{sample}$) mentioned above is replaced by the predetermined function $G(I_{RTT\_awareness})$. Similar descriptions are not repeated in detail for this embodiment.

According to a variation of this embodiment, the predetermined function $G(I_{RTT\_awareness})$ can be defined according to the following equation:

$$G(I_{RTT\_awareness})=F(AvgI_{RTT}, I_{RTT\_awareness});$$

where the notation $AvgI_{RTT}$ represents the average of the RTT awareness index $I_{RTT\_awareness}$. Please note that the predetermined function F of this variation can be similar to that disclosed in the embodiment shown in FIG. 5, with (AvgRTT, $T_{sample}$) being replaced by ($AvgI_{RTT}$, $I_{RTT\_awareness}$), respectively. Similar descriptions are not repeated in detail for this variation.

It is an advantage of the present invention that the present invention method and apparatus can set the status prohibit timer value according to the retransmission RTT between peer RLC entities and utilize the status prohibit timer to prevent the receiving side RLC entity from sending status reports too frequently, and therefore, can perform RLC properly. As a result, the related art problems will no longer be an issue.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing radio link control (RLC) with round trip time (RTT) awareness, the method being applied to an electronic device, the method comprising:

dynamically estimating an RTT of transmission/retransmission; and based upon the RTT, dynamically adjusting a status prohibit timer value of a status prohibit timer for performing RLC.

2. The method of claim 1, wherein the step of dynamically estimating the RTT of transmission/retransmission further comprises:
dynamically estimating the RTT of transmission/retransmission by detecting a time period between a first time point and a second time point, wherein the first time point represents time of sending a negative acknowledgement (NACK) status report, and the second time point represents time of value transient of a protocol variable corresponding to an RLC receive window of the electronic device.

3. The method of claim 2, wherein the NACK status report is a NACK status protocol data unit (PDU).

4. The method of claim 2, wherein the protocol variable represents a boundary of the RLC receive window.

5. The method of claim 2, wherein the protocol variable indicates a possible sequence number (SN) of protocol data units (PDUs).

6. The method of claim 1, wherein the step of dynamically adjusting the status prohibit timer value of the status prohibit timer for performing RLC further comprises:
dynamically adjusting the status prohibit timer value by applying at least one predetermined function to a plurality of samples of the dynamically estimated RTT.

7. The method of claim 6, wherein the at least one predetermined function comprises a weighted average function.

8. The method of claim 7, wherein the at least one predetermined function comprises a screening function for discarding non-qualified samples of the dynamically estimated RTT that fall outside a range of a predetermined interval.

9. The method of claim 1, wherein the step of dynamically adjusting the status prohibit timer value of the status prohibit timer for performing RLC further comprises:
dynamically adjusting the status prohibit timer value to be greater than the dynamically estimated RTT.

10. The method of claim 1, wherein the step of dynamically adjusting the status prohibit timer value of the status prohibit timer for performing RLC further comprises:
based upon the RTT, dynamically adjusting the status prohibit timer value of the status prohibit timer for performing RLC, in order to decrease probability of repeated data protocol data unit (PDU) retransmission.

11. An apparatus for performing radio link control (RLC) with round trip time (RTT) awareness, the apparatus comprising at least one portion of an electronic device, the apparatus comprising:
a processing circuit arranged to control operations of the electronic device, wherein the processing circuit comprises:
an estimation module arranged to dynamically estimate an RTT of transmission/retransmission; and
an adjustment module, wherein based upon the RTT, the adjustment module dynamically adjusts a status prohibit timer value of a status prohibit timer for performing RLC.

12. The apparatus of claim 11, wherein the estimation module dynamically estimates the RTT of transmission/retransmission by detecting a time period between a first time point and a second time point; and the first time point represents time of sending a negative acknowledgement (NACK) status report, and the second time point represents time of value transient of a protocol variable corresponding to an RLC receive window of the electronic device.

13. The apparatus of claim 12, wherein the NACK status report is a NACK status protocol data unit (PDU).

14. The apparatus of claim 12, wherein the protocol variable represents a boundary of the RLC receive window.

15. The apparatus of claim 12, wherein the protocol variable indicates a possible sequence number (SN) of protocol data units (PDUs).

16. The apparatus of claim 11, wherein the adjustment module dynamically adjusts the status prohibit timer value by applying at least one predetermined function to a plurality of samples of the dynamically estimated RTT.

17. An apparatus for performing radio link control (RLC) with round trip time (RTT) awareness, the apparatus comprising at least one portion of an electronic device, the apparatus comprising:
a processing circuit arranged to control operations of the electronic device, wherein the processing circuit comprises:
an estimation module arranged to dynamically estimate an RTT awareness index according to at least one predetermined estimation function; and
an adjustment module, wherein based upon the RTT awareness index, the adjustment module dynamically adjusts a status prohibit timer value of a status prohibit timer for performing RLC.

18. The apparatus of claim 17, wherein the estimation module monitors at least one factor regarding the electronic device, and estimates the RTT awareness index by applying the at least one predetermined estimation function to the at least one factor.

19. The apparatus of claim 18, wherein the at least one factor comprises a ratio of energy per modulating bit to noise spectral density, a received signal code power, a propagation delay, and/or a condition of whether the electronic device is moving.

20. The apparatus of claim 18, wherein the at least one factor comprises a number of out of window protocol data units (PDUs) dropped by an RLC layer of the processing circuit due to redundant transmission, a ratio of the out of window PDUs to a plurality of PDUs under consideration, and/or application layer throughput.

* * * * *